(12) United States Patent
Partsch et al.

(10) Patent No.: US 11,247,437 B2
(45) Date of Patent: Feb. 15, 2022

(54) METHOD FOR PRODUCING A COMPONENT FROM CERAMIC MATERIALS

(71) Applicants: FRAUNHOFER-GESELLSCHAFT ZUR FOERDERUNG DER ANGEWANDTEN FORSCHUNG E.V., Munich (DE); ALL-IMPEX GMBH, Ottendorf-Okrilla (DE)

(72) Inventors: Uwe Partsch, Dresden (DE); Adrian Goldberg, Dresden (DE); Steffen Ziesche, Dresden (DE); Birgit Manhica, Dresden (DE); Carolin Lohrberg, Dresden (DE); Wolfgang Duerfeld, Dresden (DE); Dietmar Arndt, Radeberg (DE); Wolfram Kern, Dresden (DE)

(73) Assignees: FRAUNHOFER-GESELLSCHAFT ZURFÖRDERUNG ANGEWANDTEN FORSCHUNG E. V., Munich (DE); ALL-IMPEX GMBH, Ottendorf-Okrilla (DE)

(*) Notice: Subject to any disclaimer, the term of this patent is extended or adjusted under 35 U.S.C. 154(b) by 141 days.

(21) Appl. No.: 15/750,617

(22) PCT Filed: Jul. 29, 2016

(86) PCT No.: PCT/EP2016/068123
§ 371 (c)(1),
(2) Date: Feb. 6, 2018

(87) PCT Pub. No.: WO2017/021291
PCT Pub. Date: Feb. 9, 2017

(65) Prior Publication Data
US 2019/0134955 A1   May 9, 2019

(30) Foreign Application Priority Data

Aug. 6, 2015 (DE) .................... 10 2015 214 997.8

(51) Int. Cl.
*B32B 18/00* (2006.01)
*C04B 35/00* (2006.01)
(Continued)

(52) U.S. Cl.
CPC ............ *B32B 18/00* (2013.01); *C04B 35/106* (2013.01); *C04B 37/001* (2013.01); *G01L 9/0044* (2013.01); *C04B 2237/62* (2013.01)

(58) Field of Classification Search
CPC ..... B32B 18/00; C04B 35/106; C04B 37/001; C04B 2237/62
See application file for complete search history.

(56) References Cited

U.S. PATENT DOCUMENTS 4,704,304 A * 11/1987 Amendola ............. H05K 3/225
427/140
4,766,671 A   8/1988 Utsumi et al.
(Continued)

FOREIGN PATENT DOCUMENTS

DE         3688356 T2    8/1993
WO    WO 2013/030064    3/2013

OTHER PUBLICATIONS

Chinese Office Action dated Jan. 2, 2020.

*Primary Examiner* — Alex B Efta
(74) *Attorney, Agent, or Firm* — Jacobson Holman PLLC

(57) ABSTRACT

The invention relates to a method for producing a component from ceramic materials in which a plurality of layers are applied to a base body by means of screen printing or template printing, said layers being formed from a ceramic material, in each case in a defined geometry above one another in the form of a paste or suspension in which powdery ceramic material and at least one binder are included. At least one region is formed here within at least one layer having a defined thickness and geometry composed of a further material that can be removed in a thermal treatment and that is likewise applied in the form of a paste or suspension by means of screen printing or template printing. Electrically functional structures composed of an electrically conductive or semiconductive material are applied to and/or formed on and/or in at least of the ceramic layers prior to the application of a further ceramic layer. The layer structure is then sintered in a thermal heat treatment, with the further material being removed and at least one hollow space being formed with defined dimensions of width, length, and height.

10 Claims, 3 Drawing Sheets

(51) Int. Cl.
*C04B 35/106* (2006.01)
*C04B 37/00* (2006.01)
*G01L 9/00* (2006.01)

(56) References Cited

U.S. PATENT DOCUMENTS

| | | | |
|---|---|---|---|
| 4,906,512 A * | 3/1990 | Roess | H01G 4/302 |
| | | | 156/89.17 |
| 6,544,365 B2 * | 4/2003 | Tokuda | H01F 41/043 |
| | | | 156/235 |
| 7,494,557 B1 | 2/2009 | Peterson | |
| 2004/0011453 A1 | 1/2004 | Roosen et al. | |
| 2007/0193675 A1 * | 8/2007 | Gurav | H01G 4/30 |
| | | | 156/89.12 |
| 2008/0218932 A1 * | 9/2008 | Berlin | H05K 1/162 |
| | | | 361/271 |

* cited by examiner

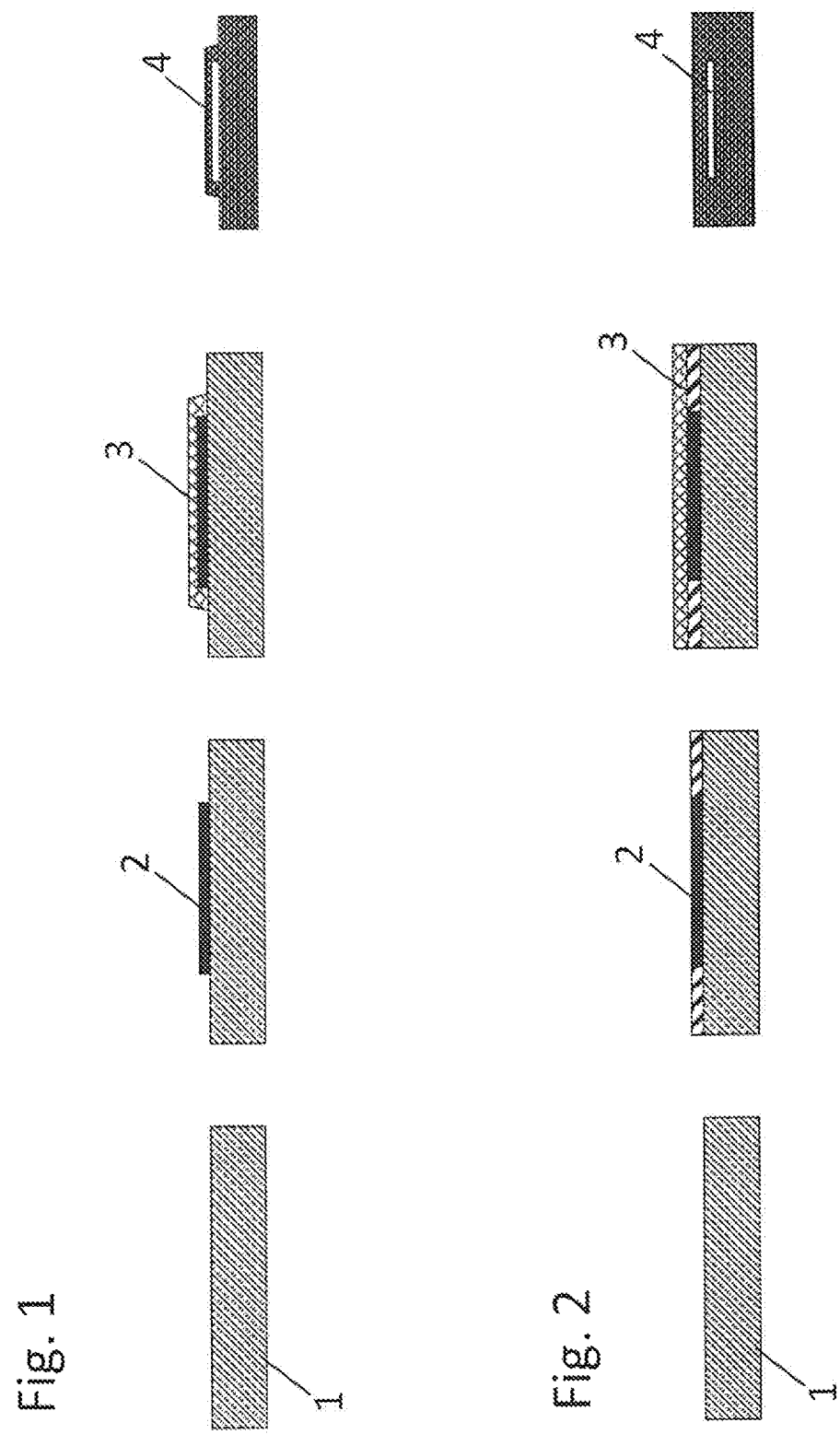

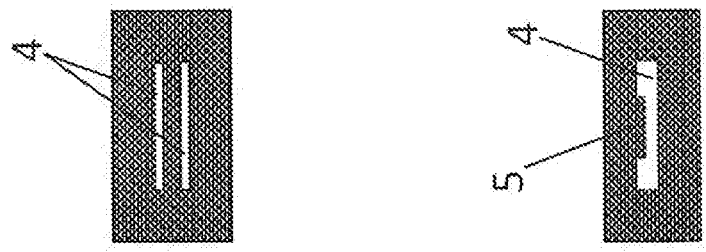
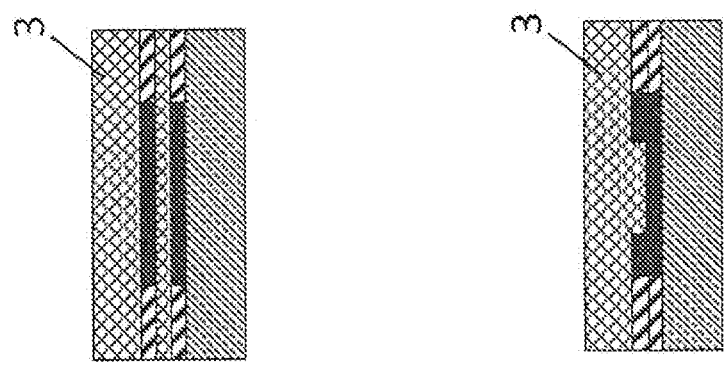
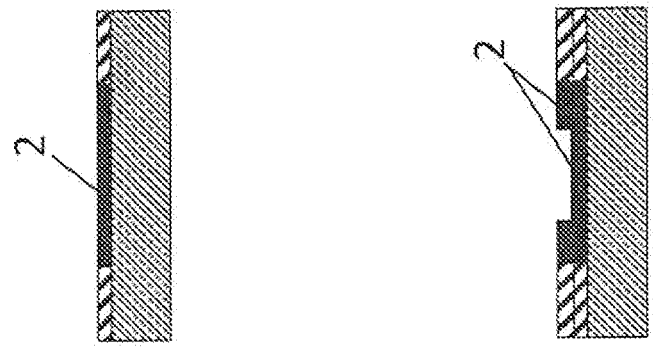
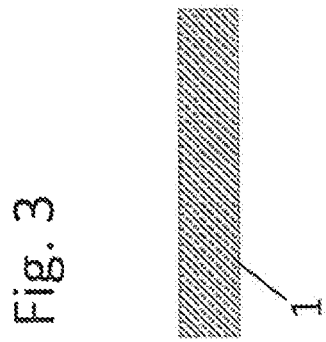
Fig. 3
Fig. 4

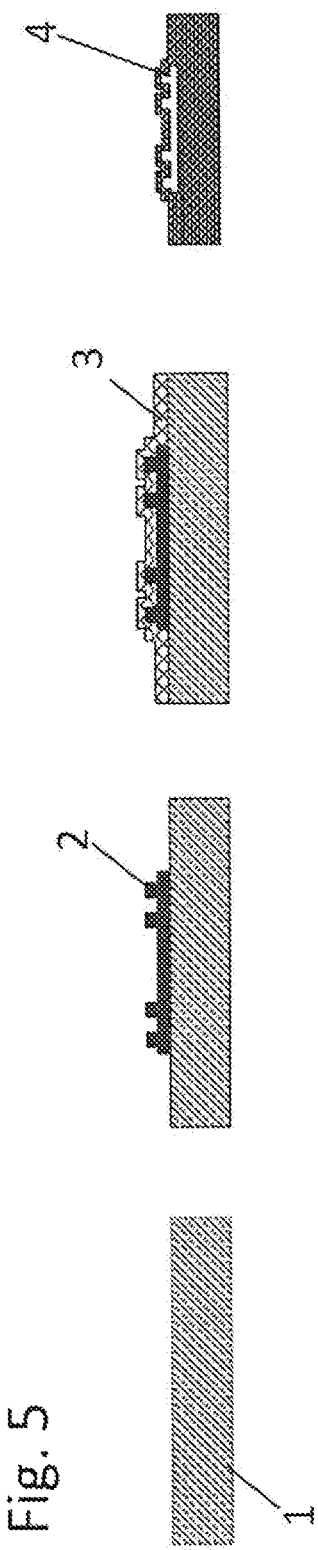

METHOD FOR PRODUCING A COMPONENT FROM CERAMIC MATERIALS

The invention relates to a method for producing a component from ceramic materials.

The ceramic multilayer technique has the aim of implementing multilayer ceramic components and microsystems. In addition to the build-up of ceramic components by the use of simple repetition units, e.g. of the same ceramic single films with surface electrodes, for multilayer capacitors and stack actuators, components based on multilayers can also represent very complex 3D structures. Application sectors for this are e.g. sensor systems, the automotive industry, telecommunications, and medical engineering and bioengineering. LTCC (low temperature cofired ceramics, sintering at T<1000° C.) and HTCC (high temperature cofired ceramics, sintering at T>1000° C.) are used as the base films in said applications.

The build-up of the multilayer components in accordance with a fixed process is common to all the applications. After the cutting to size of the green, i.e. unsintered, single films, via openings and possibly further required openings for cavities can be formed from layer to layer. This is followed by metallization of the vias by means of a stencil printing process and by printing the single films with the required functional structures such as conductive tracks or electrical resistors. Subsequent process steps are the stacking of single films manufactured in this manner and their pressing at elevated temperatures (70° C.-90° C.). On the subsequent cofiring, i.e. the common firing of the materials included in the multilayer component, the multilayer structure is compacted and is given the required functional properties.

In addition to electrical functional units, non-electrical elements, e.g. passages and chambers for conducting or mixing fluid media or membranes or mechanical springs for pressure and force measurement can also be formed.

The configuration of the required non-electrical functional elements with the available dielectric base films is common to all such applications. Since said base films are available in film thicknesses of approximately 50 µm to 250 µm, the structural resolution, i.e. the miniaturization, that can be produced is limited.

It is therefore the object of the invention to provide a method for producing a component from ceramic materials with which the components can be further miniaturized.

A method in accordance with the invention for producing a component from ceramic materials has the features of claim 1. Advantageous embodiments and further developments of the invention can be realized using features designated in subordinate claims.

In the method in accordance with the invention for producing a component from ceramic materials, a plurality of layers are applied to a base body by means of screen printing or template printing, said layers being formed from a ceramic material, in each case in a defined geometry above one another in the form of a suspension or paste in which powdery ceramic material and at least one binder are included. At least one region is formed here within at least one layer having a defined thickness and geometry composed of a further powdery material that can be removed in a thermal treatment and that is likewise applied in the form of a suspension or paste by means of screen printing or template printing.

The ceramic layers can be formed from LTCC, HTCC, alumina, zirconia, alumina toughened zirconia (ATZ), zirconia toughened alumina (ZTA), aluminum nitride and/or silicon nitride having electrically insulating or ion-conducting properties. A further material can also be called a sacrificial material.

In an alternative of the method in accordance with the invention, the regions in which a further material is introduced can be formed within at least one layer having a defined thickness and geometry, e.g. by stamping and/or laser ablation.

Electrically functional structures composed of an electrically conductive or semiconductive material can be applied to and/or formed on and/or in at least of the ceramic layers prior to the application of a further ceramic layer. The electrically functional structures can be configured in the form of electrical electrodes or conductive tracks, electrical resistors and/or coil arrangements or capacitor arrangements.

The layer structure is sintered in a thermal heat treatment, with the further material and the organic components being removed (burnt out) and at least one hollow space being formed having defined dimensions of width, length, and height. The thermal treatment can be carried out in a temperature range from 500° C. to 1800° C.

Passages, chambers, membranes and/or mechanical springs can be formed with a hollow space formed in the interior of the component. Membranes can here be formed with reinforcements and/or beads arranged in a locally defined manner and dimensioned in a defined manner.

Layers having thicknesses in the range of 10 µm to 50 µm, preferably in the range 10 µm to 20 µm, can be formed using the method in accordance with the invention.

The component can be formed in an embodiment variant of the method in accordance with the invention with layers of different ceramic materials; with the ceramic materials having different thermal coefficients of expansion and/or different degrees of shrinkage on sintering. The layers composed of the different ceramic materials can here be formed above one another in a defined order, in a defined number, and in a defined thickness. The ceramic materials used should be sinterable with one another and should be able to be joined with material continuity for this purpose. Strains and deformations can directly be introduced into the component by the different thermal coefficients of expansion of the different ceramic materials and/or by their different degree of shrinkage in the thermal treatment producing sintering. A predefinable behavior of the component at a defined temperature change can thereby be achieved. Material pairings suitable for this purpose are e.g. LTCC, zirconia/ATZ, ATZ/ZTA.

A component that was manufactured using the method in accordance with the invention can be used as a pressure sensor, a force sensor, an acceleration sensor, a micropump, a membrane valve, microreactors, micromixers, an electrochemical sensor, a fuel cell, or a piezoelectric actuator element and/or a sensor element.

Layer thicknesses from 10 µm to 20 µm and thus a doubling of the structural resolution in the thickness of the components and thus also in the lateral dimensions over conventional methods can be achieved using the method in accordance with the invention. Single layers can be formed with spatial resolution in both a subtractively and additively structured manner. This e.g. makes possible the highly exactly positioned reinforcement of membranes or springs. Miniaturized and stacked, self-supporting mechanical elements such as differential pressure sensors with a mechanical support for an increased overload-proof property can also be formed. Wall elements having varying wall thicknesses can thus be used. In addition, vias can be formed in a simple manner between the electrical functional units of the individual layers using the method in accordance with the invention.

In this respect, known standard structures can be supplemented and combined and known compatible material systems, for example for integrating conductive tracks, elongation sensors, and temperature sensors or piezoelectric sensors can be used. In addition, the costs for manufacturing components from ceramic materials can be optimized by the method.

The invention will be explained in more detail in the following with reference to Figures.

There are shown:

FIG. 1 by way of example, an embodiment variant of the method in accordance with the invention for producing a component having a membrane on a base body;

FIG. 2 by way of example, a further embodiment variant for producing a component having a membrane on a base body;

FIG. 3 an embodiment variant for producing a differential pressure sensor;

FIG. 4 by way of example, the production of a component having a partially reinforced membrane; and FIG. 5 by way of example, the production of a component having a beaded membrane.

To produce a component using the method in accordance with the invention, one or more layers of a sacrificial material are applied above one another to a base body 1 of LTCC or HTCC in the form of a paste or of a suspension by means of screen printing or template printing having a layers thickness of 10 μm-50 μm and are subsequently dried. The paste or suspension is e.g. formed with acetone, methyl ethyl ketone (MEK), MEK/ethanol, MEK/toluol/cyclohexanol, n-methyl-2-pyrrolidone (NMP), water as a solvent, and e.g. epoxy resin, polyvinyl alcohol (PVA), polyvinyl butyral (PVB), polyvinylidene fluoride (PVDF), alginates, acrylates, celluloses, UV-hardening systems as binders.

FIG. 1 shows how, after reaching a predefined thickness of the sacrificial layer structure, a round or square layer 3, that is smaller than or equal in size to the base surface of the component, composed of LTCC/HTCC is applied as a further material. The ceramic solid materials (LTCC/HTCC) of this paste or suspension have a percent by volume of 30%-65% and a particle size in the range from 0.2 μm and 5 Binder/solvent mixtures (binder:solvent:acetone, MEK, MEK/ethanol, MEK/toluol/cyclohexanol, NMP, water) compatible with the base body are used as solvent/binder mixtures having a percentage of 35 vol. %-70 vol. %, are prepared in a paste or suspension, and are applied to the layer structure by means of screen printing or template printing having a layer thickness of 15 μm-50 μm and are subsequently dried.

Electrically functional structures in the form of electrical conductive tracks and electrical resistors are in turn applied to the last applied ceramic layer in the form of a paste or suspension by means of screen printing or template printing. For this purpose, pastes or suspensions having the above-named binder-solvent mixtures and having a percentage of 30 vol. %-65 vol. % of functional particles, e.g. Ag, AgPd, AgPt, Au, Pt, Ni, Cu; glasses, RuO$_2$, ruthenate, and a particle size in the range from 0.2 μm to 5 μm are formed.

Subsequently, the total layer structure is sintered at a temperature in the range from 500° C. to 1800° C. The sacrificial material as the further material is removed here and a hollow space 4 is formed. The component can thus be used as a pressure sensor or as a membrane valve.

FIG. 2 shows an alternative embodiment variant of the method in accordance with the invention. The square or round regions to be filled with the required sacrificial material are applied by means of complementary pressure of an HTCC/LTCC paste or suspension by means of screen printing or template printing or are created by means of laser ablation from the base body.

Subsequently, the sacrificial material as the further material is applied by means of screen printing or template printing with a layer thickness of 10 μm-50 μm in the form of a paste or suspension that is formed as in the example in accordance with FIG. 1. 1-3 layers of the LTCC/HTCC suspension or paste having a layer thickness of 10 μm-50 μm are applied thereover and electrically functional structures are applied to said 1-3 layers in the form of electrical conductive tracks and electrical resistors, as described in the example in accordance with FIG. 1.

Subsequently, the layer structure is sintered at a temperature in the range from 500° C. to 1800° C. The sacrificial material as the further material is removed here and a hollow space 4 is formed.

FIG. 3 shows the production of a differential pressure sensor by way of example. Further layers of sacrificial material or LTCC/HTCC in the form of a paste or suspension are consecutively applied by screen printing or template printing to a component such as is described in FIG. 2.

On the subsequent sintering at temperatures in the range from 500° C.-1800° C., the sacrificial material as the further material is removed and two hollow spaces 4 are formed.

A membrane such as is described in the examples with respect to FIG. 1 or FIG. 2 can also be partially reinforced. FIG. 4 shows that a plurality of layers of LTCC/HTCC having a layer thickness of 20 μm-50 μm are first applied, as already described, to a base body 1 of LTCC/HTCC. These layers are applied by means of screen printing or template printing here so that they form a round or square cut-out at the surface of the component into which layers 2 of sacrificial material can be introduced as a further material by means of template printing. Further layers of sacrificial material having a layer thickness of 10 μm-20 μm are first applied in the one to two layers 3 arranged thereabove by means of screen printing or template printing, said further layers leaving the formed cut-out at the surface of the multilayer structure free. Subsequently one to two layers 3 are applied by means of screen printing or template printing such that the cut-out is filled. One to two layers 3 LTCC/HTCC having a layer thickness of 10 μm-50 μm are applied thereabove. As already described, electrically functional structures in the form of electrical conductive tracks and electrical resistors are applied thereabove.

The layer structure is then sintered at temperatures in the range from 500° C.-1800° C. and the sacrificial material as the further material is removed in so doing. A component is created having a membrane that is reinforced at a predefined position. The reinforcement 5 of the membrane serves the distribution of mechanical strains. The component can, for example, be used as a pressure sensor, force sensor or acceleration sensor.

FIG. 5 shows the manufacture of a beaded membrane by way of example.

As in the example of FIG. 1, a plurality of layers of sacrificial material having a layer thickness of 10 μm-50 μm are applied to a base body 1 of LTCC/HTCC in the form of a paste or suspension by means of screen printing or template printing. One to two circular layers 2 of the same sacrificial material having a layer thickness of 10 μm-20 μm are applied thereon in the form of a paste or suspension by means of screen printing or template printing so that circular elevated portions (beads) are formed at defined positions of the layers 2. One to two layers 3 of LTCC/HTCC having a layer thickness of 10 μm-50 μm are applied thereabove. As already described, electrically functional structures in the form of electrical conductive tracks and electrical resistors are applied thereon.

The layer structure is subsequently sintered at temperatures in the range from 500° C.-1800° C. and the sacrificial material as the further material is removed. A hollow space 4 is created. Such a component can preferably be used as a pressure sensor.

The invention claimed is:

1. Method for producing a component from ceramic materials formed as a pressure sensor, a force sensor, an acceleration sensor, a micropump, a membrane valve, a microreactor, a micromixer, or a piezoelectric actuator sensor element, in which ceramic layers including a last ceramic layer are applied to a base body by screen printing or template printing, each of said ceramic layers being formed from a ceramic material in a defined geometry above one another in the form of a paste or suspension each having a thickness in the range of 10 μm to 50 μm in which powdery ceramic material and at least one binder are included, at least one region is formed having a defined thickness and geometry from a further material that can be removed in a thermal treatment and is applied in the form of a paste or suspension by screen printing or template printing, and on the at least one region is applied a further ceramic layer formed from a ceramic material in a defined geometry in the form of a paste or suspension having a thickness in the range of 10 μm to 20 μm in which powdery ceramic material and at least one binder are included; and electrically functional structures composed of an electrically conductive or semiconductive material are applied to and formed on at least one of the ceramic layers prior to the application of the further ceramic layer; and the layer structure is sintered in a thermal heat treatment, sintering the ceramic material in the at least one ceramic layer and the further ceramic layer, with the further material being removed and, between the at least one sintered ceramic layer and the sintered further ceramic layer, at least one hollow space surrounded by the sintered ceramic material being formed with defined dimensions of width, length, and height, wherein the at least one hollow space with the sintered further ceramic layer having a pre-sintered thickness in the range of 10 μm to 20 μm forms a membrane or a mechanical spring.

2. A method in accordance with claim 1, characterized in that the ceramic layers are formed from LTCC, HTCC, $Al_2O_3$, $ZrO_2$, alumina toughened zirconia (ATZ), zirconia toughened alumina (ZTA), AlN and/or $Si_3N_4$.

3. A method in accordance with claim 1, characterized in that the ceramic layers of the component are formed in a defined order, in a defined number, and in a defined thickness, in each case from different ceramic materials, with the different ceramic materials having different thermal coefficients of expansion and/or different degrees of shrinkage on sintering and being sinterable with one another.

4. A method in accordance with claim 1, characterized in that epoxy resin, polyvinyl alcohol (PVA), polyvinyl butyral (PVB), polyvinylidene fluoride (PVDF), alginates, acrylates, celluloses, or UV-hardening systems are used.

5. A method in accordance with claim 1, characterized in that the thermal treatment is carried out in a temperature range from 500° C. to 1800° C.

6. A method in accordance with claim 1, characterized in that regions into which a further material is introduced are formed within at least one layer having a defined thickness and geometry by stamping and/or laser ablation.

7. A method in accordance with claim 1, characterized in that electrically functional structures are configured in the form of electrical electrodes or conductive tracks, electrical resistors and/or coil and/or capacitor arrangements.

8. A method in accordance with claim 1, characterized in that passages and chambers are formed with hollow spaces formed in the interior of the component.

9. A method in accordance with claim 1, characterized in that a membrane is formed having reinforcements and/or beads arranged in a locally defined manner and dimensioned in a defined manner.

10. A method in accordance with claim 1, characterized in that the ceramic layers are formed having thickness in the range of 10 μm to 20 μm.

* * * * *